US012195341B2

(12) United States Patent
Gautam et al.

(10) Patent No.: US 12,195,341 B2
(45) Date of Patent: Jan. 14, 2025

(54) PROCESS FOR REMOVAL OF SULFIDES FROM CARBON MONOXIDE RICH GAS STREAM AT AMBIENT TEMPERATURES

(71) Applicant: SABIC GLOBAL TECHNOLOGIES B.V., Bergen op Zoom (NL)

(72) Inventors: Pankaj Singh Gautam, Sugar Land, TX (US); Zheng Liu, Sugar Land, TX (US); Tian Gu, Richmond, TX (US); Debashis Chakraborty, Missouri City, TX (US); Sanjeev Deshpande, Sugar Lane, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 1033 days.

(21) Appl. No.: 17/259,362

(22) PCT Filed: Jul. 17, 2019

(86) PCT No.: PCT/IB2019/056121
§ 371 (c)(1),
(2) Date: Jan. 11, 2021

(87) PCT Pub. No.: WO2020/016806
PCT Pub. Date: Jan. 23, 2020

(65) Prior Publication Data
US 2021/0300766 A1 Sep. 30, 2021

(30) Foreign Application Priority Data
Jul. 17, 2018 (EP) .................................... 18183831

(51) Int. Cl.
*C01B 32/80* (2017.01)
*B01D 53/04* (2006.01)
(Continued)

(52) U.S. Cl.
CPC .............. *C01B 32/80* (2017.08); *B01D 53/04* (2013.01); *B01D 53/52* (2013.01); *B01D 53/82* (2013.01);
(Continued)

(58) Field of Classification Search
CPC .......... C10K 1/004; C10K 1/32; B01D 53/04; B01D 53/52; B01D 53/82;
(Continued)

(56) References Cited

U.S. PATENT DOCUMENTS 7,250,530 B2    7/2007  Bagala et al.
2009/0311156 A1  12/2009 Schmidt et al.

FOREIGN PATENT DOCUMENTS

CN    107398279 A    11/2017
DE    4321542 C1    9/1994
(Continued)

OTHER PUBLICATIONS

Machine translation of WO2010064325 (Year: 2010).*
(Continued)

*Primary Examiner* — Robert Clemente
(74) *Attorney, Agent, or Firm* — CANTOR COLBURN LLP

(57) ABSTRACT

Disclosed are methods and systems for desulfurization of CO-rich streams. A method can include contacting a CO-rich gas stream with activated carbon and/or contacting the CO-rich gas stream with a zinc-oxide sorbent material at a temperature of ( ) to 50° C. to remove at least a portion of the sulfur-containing compounds present in the stream.

19 Claims, 3 Drawing Sheets

(51) Int. Cl.
| | |
|---|---|
| *B01D 53/52* | (2006.01) |
| *B01D 53/82* | (2006.01) |
| *B01J 20/08* | (2006.01) |
| *B01J 20/20* | (2006.01) |
| *B01J 20/28* | (2006.01) |
| *C01B 32/40* | (2017.01) |
| *C10K 1/00* | (2006.01) |
| *C10K 1/32* | (2006.01) |

(52) U.S. Cl.
CPC ............... *B01J 20/08* (2013.01); *B01J 20/20* (2013.01); *B01J 20/28059* (2013.01); *C01B 32/40* (2017.08); *C10K 1/004* (2013.01); *C10K 1/32* (2013.01); *B01D 2251/602* (2013.01); *B01D 2253/102* (2013.01); *B01D 2253/1124* (2013.01); *B01D 2253/306* (2013.01); *B01D 2256/20* (2013.01); *B01D 2257/304* (2013.01); *B01D 2257/308* (2013.01); *C01B 2210/0007* (2013.01); *C01B 2210/0017* (2013.01); *C01B 2210/0064* (2013.01)

(58) Field of Classification Search
CPC ........ B01D 2251/602; B01D 2253/102; B01D 2253/1124; B01D 2253/306; B01D 2256/20; B01D 2257/30–308; B01J 20/08; B01J 20/20; B01J 20/28059–28066
See application file for complete search history.

(56)  References Cited

FOREIGN PATENT DOCUMENTS

| | | | |
|---|---|---|---|
| GB | 2114911 A | 9/1983 | |
| WO | 03068370 A1 | 8/2003 | |
| WO | 2007065884 A1 | 6/2007 | |
| WO | 2009013233 A2 | 1/2009 | |
| WO | WO-2010064325 A1 * | 6/2010 | .......... B01J 20/0225 |

OTHER PUBLICATIONS

Garces et al.; "Low temperature H2S dry-desulfurization with zinc oxide"; Microporous and Mesoporous Materials; vol. 127; 2010; pp. 190-197.

International Search Report; International Application No. PCT/IB2019/056121; International Filing Date: Jul. 17, 2019; Date of Mailing: Oct. 1, 2019; 4 pages.

Written Opinion; International Application No. PCT/IB2019/056121; International Filing Date: Jul. 17, 2019; Date of Mailing: Oct. 1, 2019; 7 pages.

* cited by examiner

PROCESS FOR REMOVAL OF SULFIDES FROM CARBON MONOXIDE RICH GAS STREAM AT AMBIENT TEMPERATURES

CROSS REFERENCE TO RELATED APPLICATIONS

This application a national stage application of International Application No. PCT/IB2019/056121, filed Jul. 17, 2019, which claims priority to European Application No. 18183831.9, filed Jul. 17, 2018, both of which are incorporated by reference in their entirety.

BACKGROUND OF THE INVENTION

A. Field of the Invention

The invention generally concerns a process for producing phosgene, and especially for using an integrated process for the separation of sulfides from carbon monoxide (CO)-rich gas streams at ambient temperatures.

B. Description of Related Art

Partial combustion of petroleum coke or other kinds of carbonaceous materials using oxygen or air is used to produce a gas stream having high concentrations of CO. The CO-rich stream can include sulfides (e.g., $H_2S$, COS, $CS_2$) and $CO_2$. After purification of this CO-rich stream to remove carbon dioxide, it can be used for producing a variety of synthetic chemicals. Depending on the chemical process, the required sulfides concentration in the CO-rich stream may be less than 100 ppm (parts per million). Thus, further purification of the CO-rich stream to remove sulfide may be necessary.

Various attempts to remove sulfides from CO-rich streams have been described. By way of example, activated carbon can be used to remove sulfides from CO streams through adsorption. However, the adsorption capacity of activated carbon is very limited for $H_2S$ compared with the capacity for COS or $CS_2$. When the CO stream contains higher concentrations of COS and $CS_2$ than $H_2S$, the activated carbon can efficiently remove the sulfides. Conversely, if the $H_2S$ content in the CO stream is equal to or the same as the COS and $CS_2$ concentrations, the activated carbon can suffer from premature breakthrough of sulfides, leading to more frequent regeneration and potentially lower throughput of downstream production. Attempts to provide more efficient processes to purify CO-rich streams have been described. By way of example, U.S. Pat. No. 7,250,530 to Bagala et al. describes a process for removing $H_2S$ from a CO gas stream that includes an activated carbon composition in one or more upstream adsorbers at a temperature of 25° C. Since this adsorbent readily became saturated with $H_2S$, the modified gas stream was passed to a second adsorber unit downstream of the first unit at 22° C., which included a metal oxide-impregnated activated carbon composition. The metal oxide-impregnated support included copper oxide (CuO), lanthanum oxide ($La_2O_3$), zinc titanate ($ZnTiO_3$), iron oxides (FeO, $Fe_2O_3$, and the like) calcium oxide (CaO), silica ($SiO_2$), aluminum oxide ($Al_2O_3$) or one of the oxide in combination with CuO. This process is inefficient, as the $H_2S$ is also converted to COS, which then had to be removed from the stream and the CuO sorbent has a low $H_2S$ capacity (fraction of bed weight of about 4%).

In another example, Garces et al. (Microporous and Mesoporous Materials, 2010, V1. 27, 150-7) describes using ZnO as a $H_2S$ adsorbent at temperatures of 60 to 400° C. In this study, ZnO deactivated faster at lower temperatures and performed best at 400° C.

GB 2 114 911 is directed to treating sulpher-containing gases. Disclosed is that hydrogen sulfide and/or carbonyl sulfide in a gas which does not substantially contain oxygen can easily be removed from the gas by contacting the gas with activated carbon containing (1) copper compound and (2) an alkali metal compound and/or alkaline earth metal compound at a temperature of not higher than 150° C.

WO 03/068370 is directed to a process for the selective removal of Sulphur compounds from synthesis gas rich in carbon monoxide and containing hydrogen, carbon monoxide, carbon dioxide, and steam. The process comprises contacting the synthesis gas at a maximum contact temperature of 100° C. with an absorbent comprising Cu/ZnO compounds and being prepared by thermal decomposition of a corresponding carbonate and activation of the thermal decomposed carbonate with a reducing gas.

While various attempts to remove sulfides from CO-rich streams have been attempted, these suffer from rapid breakthrough, are inefficient, and/or use reagents that form COS from the reaction of $H_2S$ and CO. Still further, many of these processes rely on increased temperatures, which can lead to break down of materials and increased costs associated with increased energy input.

SUMMARY OF THE INVENTION

A discovery has been made that provides a solution to at least some of the aforementioned problems associated with removing sulfides from a CO-rich stream. The solution is premised on the use of a reactive sorbent system that can be operated at temperatures of 50° C. or less, where the reactive sorbent system includes materials that have a relatively high capacity to selectively sorb $H_2S$ from a dry CO stream (e.g., a CO stream having a dew point less than −40° C.) at ambient temperature (e.g., 15° C. to 50° C.). In one particular instance, the reactive sorbent system can include an alumina supported zinc oxide sorbent material. In another instance, a second sorbent material that includes activated carbon can also be used. Some advantages of this sorbent system is that it can be operated at ambient temperatures (e.g., 15° C. to 50° C.) and can produce purified CO streams having less than 50 ppm of total sulfides. Notably, the removal of $H_2S$ from the CO stream can be performed in the absence of moisture a (e.g., a dew point less than −40° C.) and/or no COS or $CS_2$ is formed during the $H_2S$ removal process. Still further, the zinc oxide sorbent has a higher $H_2S$ capacity (fraction of bed weight of greater than 8%) as compared to current commercial processes. The desulfurized CO stream can have a sufficient purity to be used as a reactant with chlorine ($Cl_2$) to produce phosgene ($COCl_2$).

In one aspect of the invention, methods of removing sulfur-containing compounds from a carbon monoxide (CO)-rich gas stream having greater than 50 mol % CO are described. A method can include a step (a) of contacting the CO-rich gas stream with a first sorbent material comprising activated carbon to remove at least a portion of the sulfur-containing compounds present in the stream, and (b) contacting the CO-rich gas stream with a second sorbent material that includes zinc-oxide at a temperature of 50° C. or less to remove at least a portion of the sulfur-containing compounds present in the stream. Step (a) and (b) can be performed in any order. However, it is preferred that step (a) be performed prior to step (b). The CO-rich gas stream can have at least 50 mol % CO, preferably at least 80 mol %, and more preferably at least 90 mol %, CO and less than 5 mol %, preferably less than 1 mol % $H_2$. The CO-rich gas stream can include sulfur-containing compounds of carbonyl sulfide (COS), carbon disulfide ($CS_2$), hydrogen sulfide ($H_2S$), or combinations thereof. In some embodiments, the first sorbent material can remove at least a portion of the COS and $CS_2$ from the CO-rich stream and the second sorbent material can remove at least a portion of the $H_2S$ from the CO-rich stream. Contacting steps (a) and/or (b) can be performed at a temperature of 15° C. to 50° C. The desulfurized CO-rich gas stream can include 200 ppm, or less, of total sulfides (including $H_2S$, COS, and $CS_2$). The second sorbent material can be a high B.E.T. surface area (e.g., at least 80 m²/g) zinc oxide material and include 0.1 wt % to 100 wt % zinc oxide preferably 60 wt % to 70 wt % zinc oxide. The zinc oxide can be a supported zinc oxide. In some embodiments, the zinc oxide is supported on alumina ($Al_2O_3$) having a B.E.T. surface area of at least 80 m²/g. In some embodiments, the second sorbent material can include 60 wt % to 70 wt % zinc oxide and 30 wt % to 40 wt % alumina. In certain aspects, the zinc oxide does not include zinc titanate and/or is not a mixture of zinc oxide and titanium oxide. In some embodiments, a metal oxide impregnated carbon sorbent is not used in the method. In some embodiments, the second sorbent material is not doped with catalytically active metal, preferably, copper (Cu), iron (Fe), molybdenum (Mo), cerium (Ce), nickel (Ni), magnesium (Mg), chromium (Cr), and/or manganese (Mn), or alloys or oxides thereof.

Another method of the present invention can include contacting the CO-rich gas stream with a sorbent material that includes a supported zinc oxide at a temperature of 50° C. or less to remove at least a portion of $H_2S$ present in the stream to produce a purified CO-rich gas stream, where the sorbent material is not doped with copper (Cu), iron (Fe), molybdenum (Mo), cerium (Ce), nickel (Ni), magnesium (Mg), chromium (Cr), and/or manganese (Mn), or alloys or oxides thereof. The selectivity of the sorbent material for the reaction in equation 1 is less than 10%, more preferably less than 5%. Said another way, the rate of $H_2S$ removal using the reactive sorbent material of the present invention is at least 10 times greater than the rate of COS generation through reaction 1. This is illustrated in a non-limiting manner in the Table 2 of the Examples, where breakthrough of $H_2S$ was observed for the alumina supported ZnO instead of the COS, which was observed for the activated alumina, promoted alumina, ZnO and MnO on alumina, zeolites and silver oxide sorbents.

$$CO+H_2S \rightarrow COS+H_2. \qquad (1)$$

In some embodiments, the sorbent material can include 10 wt % to 90 wt % (preferably 60 wt % to 70 wt %) zinc oxide and 10 wt % to 90 wt % (preferably 30 wt % to 40 wt %) alumina and/or does not include activated carbon. The desulfurized CO stream can have less than 200 ppm, preferably 50 ppm or less, more preferably than 20 ppm or less of total sulfides (e.g., $H_2S$, COS, and $CS_2$).

In yet another aspect of the invention desulfurization systems using the methods of the present invention are described. A system can include a first purification unit, a second purification unit, an optional CO generation unit and an optional reactor. The first purification unit can include activated carbon and be capable of removing at least a portion of carbonyl sulfide (COS) or carbon disulfide ($CS_2$), or both, present in a carbon monoxide (CO)-rich gas stream that has less than 10 mol % hydrogen gas ($H_2$). The second purification unit can be in fluid communication with the first purification unit. The second purification unit can include zinc-oxide and be capable of removing at least a portion of hydrogen sulfide ($H_2S$) present in the stream at a temperature of 50° C. or less. The optional CO generation unit can be capable of generating the CO-rich gas stream from petroleum coke and an oxygen source. The CO generation unit can be positioned upstream from the first and second purification units. The optional reactor can be positioned downstream from the first and second purification units and be capable of converting CO to a chemical compound, preferably phosgene.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

BRIEF DESCRIPTION OF THE DRAWINGS

Advantages of the present invention may become apparent to those skilled in the art with the benefit of the following detailed description and upon reference to the accompanying drawings.

Figure 1A:
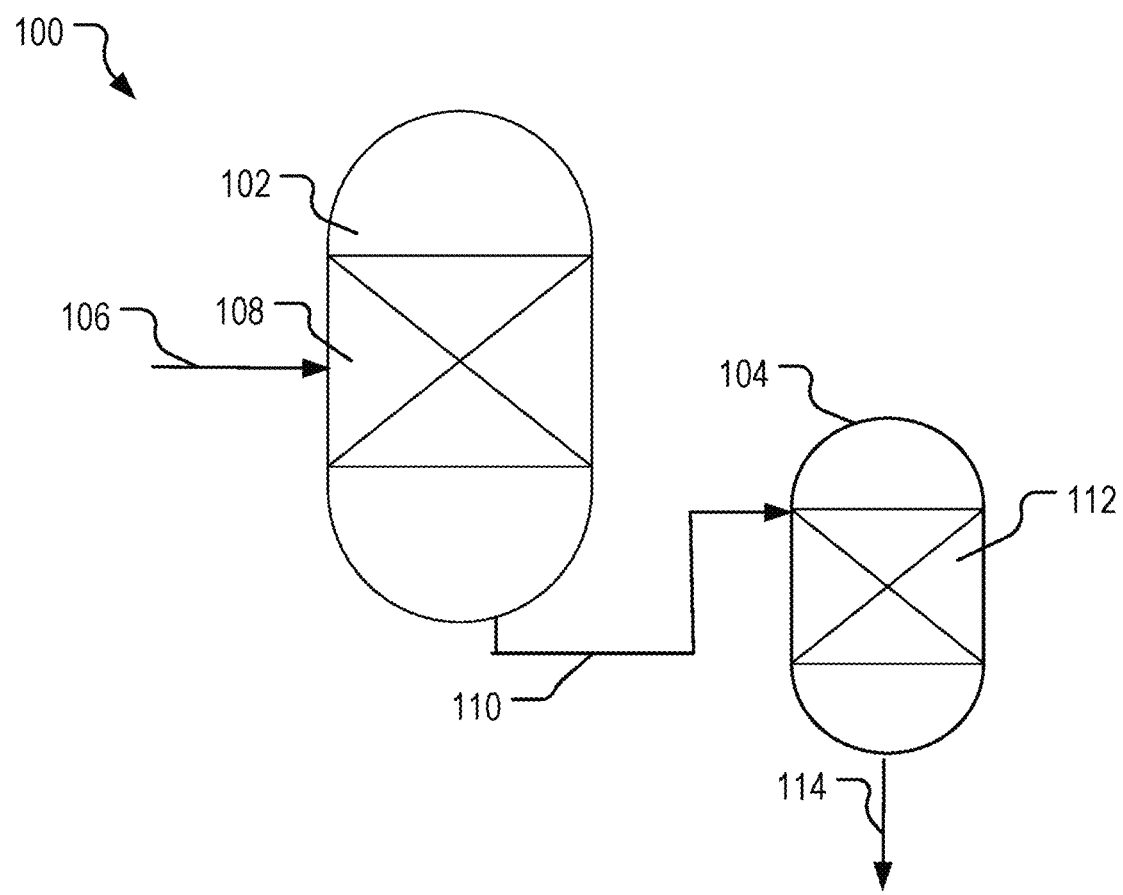
FIGS. 1A and 1B are schematics of a system and method to desulfurize a CO-rich stream using two purification units.

While the invention is susceptible to various modifications and alternative forms, specific embodiments thereof are shown by way of example in the drawings. The drawings may not be to scale.

DETAILED DESCRIPTION OF THE INVENTION

Disclosed herein is a solution to at least some of the current problems associated with desulfurizing CO-rich streams that includes greater than 90 mol % CO and/or less than 10 mol % $H_2$. The solution resides in contacting the CO-rich stream with sorbent materials at temperatures less than 50° C. to produce a desulfurized CO stream having less than 200 ppm of total sulfides (e.g., $H_2S$, COS, and $CS_2$), preferably less than 100 ppm, more preferably less than 50 ppm $H_2S$. The sorbent materials can be activated carbon and zinc oxide. The zinc oxide can be a supported zinc oxide, preferably alumina supported zinc oxide. For example, the sorbent material can comprise alumina supported zinc oxide having a BET surface area of greater than or equal to 75 square meters per gram (m²/g), preferably greater than or equal to 80 m²/g. In one aspect of the present invention, the supported zinc oxide can be used as the sole sorbent material at the exclusion of activated carbon. The method and systems provide an energy efficient and elegant way to desulfurize CO-rich streams. The produced CO stream can be used in reactions that are sensitive to sulfur (e.g., production of phosgene). These and other non-limiting aspects of the present invention are discussed in further detail in the following sections with reference to the figures.

For example, a method of removing hydrogen sulfide ($H_2S$) from a carbon monoxide (CO)-rich gas stream that has at least 50 mol. % CO, can comprise: contacting the CO-rich gas stream with a sorbent material comprising a supported zinc oxide, preferably an alumina ($Al_2O_3$) supported zinc oxide, and even more preferably, an $Al_2O_3$ supported zinc-oxide comprising 60 wt. % to 70 wt. % zinc oxide and 30 wt. % to 40 wt. % $Al_2O_3$ at a temperature of 50° C. or less to remove at least a portion of $H_2S$ present in the stream to produce a purified CO-rich gas stream, wherein the sorbent material is not doped with copper (Cu), iron (Fe), molybdenum (Mo), cerium (Ce), nickel (Ni), magnesium (Mg), chromium (Cr), and/or manganese (Mn), or alloys or oxides thereof, and wherein the selectivity of the sorbent material for the following reaction is less than 10% $CO+H_2S \rightarrow COS+H_2$, wherein optionally COS and/or $CS_2$ is not produced, wherein optionally the CO-rich stream has a dew point of −40° C. or less, wherein optionally the sorbent material does not comprise activated carbon, and/or wherein optionally the de-sulfided CO-rich gas stream has 20 ppm, or less, of total sulfides.

A. Materials

1. CO-Rich Gas Stream

CO-rich gas streams can be obtained from partial oxidation or full oxidation of coke. This process produces streams that include hydrogen ($H_2$), CO, carbon dioxide ($CO_2$), COS, $CS_2$, and $H_2S$. In some embodiments, hydrogen is not produced. The stream can be purified to remove or reduce the amount of $H_2$ and/or to increase the concentration of CO to at least 50 mol %. In a preferred embodiment, the generation of CO produces water instead of hydrogen, resulting in a product stream that includes CO contaminated with $H_2O$, COS, $CS_2$, $H_2S$, and mixtures thereof. In some embodiments, the CO-rich stream can include about 100 ppm to about 1000 ppm $H_2S$; about 4,000 ppm to about 20,000 ppm COS (preferably 4,000 ppm to about 10,000 ppm, more preferably 4,000 ppm to about 5,000 ppm); and about 500 ppm to about 10,000 ppm $CS_2$ (preferably about 1,000 ppm to about 7,500 ppm $CS_2$, more preferably about 1,500 ppm to about 5,000 ppm $CS_2$) with the balance being CO. If water is present, the CO-rich stream can have a dew point of −40° C. or less. The CO concentration in the CO-rich stream can be at least, equal to, or between any two of 50 mol %, 55 mol %, 60 mol %, 65 mol %, 70 mol %, 75 mol %, 80 mol %, 85 mol %, 90 mol %, 95 mol % or 99 mol %, or 99.5 mol % with the balance being sulfide impurities and $CO_2$ and optionally water. For example, the CO concentration in the CO-rich stream can be 50 mol % to 99.5 mol %, preferably 75 mol % to 99.5 mol %, or 90 mol % to 99.5 mol %, with the balance being sulfide impurities and $CO_2$ and optionally water. In some embodiments, the CO-rich stream includes up to 5 mol % $CO_2$.

Other gases can be present in the CO stream, provided that these do not negatively affect the reactive sorbent. Examples of such other gases include inert gases (e.g., nitrogen or argon). In some aspects of the invention, the CO gas stream is substantially devoid of other reactant gas such as hydrocarbon gases, oxygen gas, hydrogen gas, water, or any combination thereof. Non-limiting examples of hydrocarbon gases include $C_1$ to $C_5$ hydrocarbon gases, such as methane, ethylene, ethane, propane, propylene, butane, butylene, isobutene, pentane and pentene. In a particular aspect of the invention, the gaseous feed contains about or less than 10 mol %, 5 mol %, 1 mol %, 0.1 mol % or less, or 0.0001 mol % to 0.1 mol % of $H_2$ and/or combined other reactant gas. In one preferred instance, the gaseous feed contains less than 0.1 mol % $H_2$.

2. Sorbent Materials

The sorbent materials can include activated carbon and zinc oxide. Non-limiting examples of commercially available activated carbon include BPL® activated carbon (Calgon Carbon Corporation, USA.). The BPL® activated carbon may be used unmodified in a purification unit to remove COS and $CS_2$ and optionally $H_2S$. BPL® activated carbon may also be modified for use in the purification unit to remove sulfides by impregnating the activated carbon with metal oxide(s), and optionally with other metal compounds.

The zinc oxide (ZnO) sorbent material can be either supported or unsupported. It must be noted that many ZnO containing reactive sorbents do not demonstrate the activity at low temperatures, i.e., capacity to remove $H_2S$ at ambient temperatures (<50° C.) or have poor selectivity to $H_2S$ removal. As such, presence of ZnO in a sorbent, is not sufficient condition for a reactive sorbent to selectively remove $H_2S$. Non-limiting examples of supports include inert refractory oxides. Non-limiting examples of refractory oxides include silica, alumina, magnesia, calcium oxide, and the like. By way of example, the zinc oxide can be supported on alumina. In one preferred aspect of the present invention, the supported zinc oxide material can have at least, equal to, or between 60 wt %, 61 wt %, 62 wt %, 63 wt %, 64 wt %, 65 wt %, 66 wt %, 68 wt %, 69 wt %, and up to 70 wt % zinc oxide with the balance being support material or an inert material. In some embodiments, the supported zinc oxide includes at least, equal to, or between any two of 30 wt %, 31 wt %, 32 wt %, 33 wt %, 34 wt %, 35 wt %, 36 wt %, 37 wt %, 38 wt %, 39 wt %, and 40 wt % of support, preferably alumina. In a preferred embodiments, the supported zinc oxide sorbent includes 60 to 70 wt % zinc oxide and 30 to 40 wt % alumina. The alumina supported zinc oxide can have a $H_2S$ capacity of 5 to 30 wt % from 15° C. to greater than 200° C. In some embodiments, the alumina supported zinc oxide can have a $H_2S$ capacity of 6 to 12 wt % at 20 to 50° C. A BET specific surface area of the supported zinc oxide can be greater than 80 m$^2$/g. The supported zinc oxide can have a BET specific surface area of 80 m$^2$/g or more, or at least, equal to or between any two of 80 m$^2$/g, 90 m$^2$/g, 100 m$^2$/g, 110 m$^2$/g, 120 m$^2$/g, 130 m$^2$/g, 140 m$^2$/g, 150 m$^2$/g, 200 m$^2$/g, 250 m$^2$/g, 300 m$^2$/g. In one instance, the alumina has a BET specific surface area of 80 m$^2$/g to 200 m$^2$/g, preferably 80 m$^2$/g to 150 m$^2$/g. Zinc oxide sorbents are available from commercial suppliers. A non-limiting example of a commercial product is SR-110CX from Unicat Catalyst Technologies Inc., USA. In a preferred embodiment, the zinc oxide sorbent consists of, or consists essentially of, 60 wt % to 70 wt % ZnO.

The sorbent material comprising the zinc oxide (ZnO) can be supported on alumina and can have a B.E.T. surface area of greater than or equal to 50 m$^2$/g, preferably greater than or equal to 80 m$^2$/g, as measured in accordance with ASTM D3663-03, and can be a non-carbon support (e.g., can be free of activated carbon). The selectivity of this sorbent material to $H_2S$ removal compared with its selectivity to COS formation defined as the ratio of ppm $H_2S$ to ppm COS at breakthrough of the sorbent can be greater than 10. Desirably, this sorbent material is not doped with catalytically active metal. Desirably, this sorbent material is not doped with copper, and more desirably, the sorbent material is not doped with copper (Cu), iron (Fe), molybdenum (Mo), cerium (Ce), nickel (Ni), magnesium (Mg), chromium (Cr), and/or manganese (Mn), or alloys or oxides thereof. This sorbent material can have an $H_2S$ sorption capacity of greater than 6 wt %, preferably greater than or equal to 8 wt %, more preferably greater than or equal to 9 wt %, of the second sorbent material weight at 37.8° C. and 0.85 MPa, e.g., prior to breakthrough of greater than or equal to 100 ppm H$_2$S, preferably prior to breakthrough of greater than or equal to 100 ppm H$_2$S and COS combined.

B. Systems and Methods to Desulfurize a CO-Rich Stream

Figure 1B:
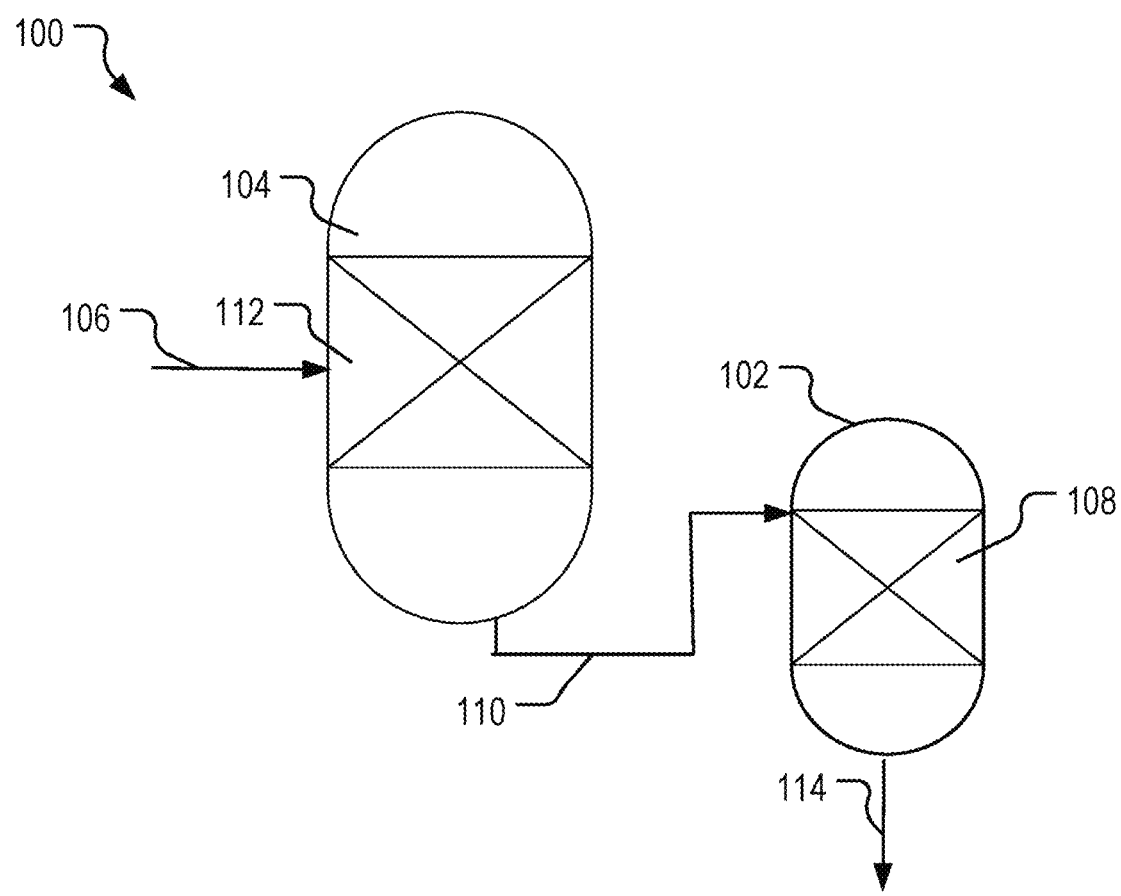

Referring to FIGS. 1A and 1B, system 100 can be used to perform the methods of the present invention. System 100 can include first purification unit 102 and a second purification unit 104. Referring to FIG. 1A, purification units 102 and 104 are operated in series. CO-rich stream 106 can enter first purification unit 102 and contact a first sorbent (e.g., activated carbon) in contacting zone 108. The CO-rich stream 106 can be dried to a dew point of less than −40° C. prior to or while entering purification 102. The dew point of the CO-rich stream at atmospheric pressure (e.g., 0.1 mega Pascals (MPa)) can be less than, equal to or between any two of −40° C., −45° C., and −50° C., or less than, equal to, or between any two of 85, 50, 40, 20, 10, 5, or 0 ppmw of H$_2$O. Dew point values can be determined using commercially available dew point meters. Non-limiting examples of dew point meter manufacturers include Alpha Moisture Systems (UK), Howell Laboratories, Inc. (USA), Michell Instruments, Ltd. (US.). CO-rich stream 106 can include CO, CO$_2$, H$_2$S, COS, CS$_2$, H$_2$O in the amounts described in the Materials section and throughout the specification. Contacting conditions can include temperature, pressure, and space velocity (e.g., gas hourly space velocity (GHSV)), or combinations thereof. The contact temperature can be from at least, equal to, or between any two of 0° C., 15° C., 20° C., 25° C., 30° C., 35° C., 40° C., 45° C., and 50° C. In a preferred embodiment, the contact temperature can be 20 to 35° C. A pressure can be at least, equal to, or between any two of 0.1, 0.15, 0.2, 0.25, 0.3, 0.35, 0.4, 0.45, 0.5, 0.55, 0.6, 0.65, 0.7, 0.75 to 0.85 MPa, for example, 0.1 to 0.85 MPa, or 0.3 to 0.7 MPa. GHSV can range from 10 h$^{-1}$ to 1,000,000 h$^{-1}$. The pressure and space velocity can be chosen and adjusted to meet the parameters of the sorbing unit and amount of sorbent used. While only one purification unit is shown, multiple units can be used in the method. For example, at least 2 purification units 102 can be used so that one unit is being regenerated while the other unit is used to purify the CO-rich stream. Contact of the CO-rich stream 106 with the first sorbent in contacting zone 108 removes a portion of the sulfides from the CO-rich stream and produces modified CO-rich stream 110. By way of example, the first sorbent in contacting zone 108 can be activated carbon and contact of CO-rich stream 106 with the activated carbon can remove all or substantially all of the COS and CS$_2$ from the CO-rich stream.

Modified stream 110 can exit first purification unit 102 and enter second purification unit 104 and contact a second sorbent (e.g., zinc oxide or supported zinc oxide) in contacting zone 112. Modified CO-rich stream 110 can include CO, CO$_2$, H$_2$S, and H$_2$O in the amounts higher than that of CO-rich stream 106 due to the removal of a portion of the sulfides. In other embodiments, modified CO-rich stream can include CO, CO$_2$, H$_2$S, H$_2$O, and minimal amounts of CS$_2$ and COS. Contacting conditions can include temperature, pressure, and space velocity (e.g., gas hour space velocity (GHSV)), or combinations thereof. The contact temperature can be from at least, equal to, or between any two of 0° C., 15° C., 20° C., 25° C., 30° C., 35° C., 40° C., 45° C., and 50° C. In a preferred embodiment, the contact temperature can be 20 to 35° C. A pressure can be at least, equal to, or between any two of 0.1, 0.15, 0.2, 0.25, 0.3, 0.35, 0.4, 0.45, 0.5, 0.55, 0.6, 0.65, 0.7, 0.75 to 0.85 MPa. GHSV can range from 10 h$^{-1}$ to 500,000 h$^{-1}$. The pressure and space velocity can be chosen and adjusted to meet the parameters of the units and amount of sorbent used. While only one purification unit is shown, multiple units can be used in the method. For example, at least 2 purification units 104 can be used so that one unit is being regenerated while the other unit is used to purify modified CO-rich stream 110. Contact of modified CO-rich stream 110 with the second sorbent 104 in contacting zone 112 removes a portion of the sulfides from the CO-rich stream and produces desulfurized CO-rich stream 114. By way of example, the second sorbent in contacting zone 1 12 can be supported zinc oxide and contact of modified CO-rich stream 110 with the zinc oxide or supported zinc oxide can remove H$_2$S from the modified CO-rich stream. In certain preferred instances, during contact no, or substantially no, COS or CS$_2$ is formed from the reaction of H$_2$S and CO in the presence of the zinc oxide and/or supported zinc oxide. Still further, and in certain preferred instances, there is low to no moisture content present during the contact step (e.g., the stream has a dew point of −40° C. or less). While FIG. 1A shows the contact of the CO-rich stream with a first unit 102 having, for example, activated carbon, first followed by contact with the second sorbent (for example, zinc oxide) in unit 104 having, FIG. 1B shows the CO-rich stream 106 being contacted first with the second sorbent (for example, zinc oxide) in unit 104 having to form modified CO-rich stream 110, and then with the first sorbent (for example, activated carbon) in unit 102 in contacting zone 108 to form desulfurized stream 114. In some embodiments, the units are run in parallel. In some embodiments, only purification unit(s) 104 containing the zinc oxide material are used in system 100 to reduce the amount of sulfides in the CO-rich stream.

Desulfurized stream 114 can include at least, equal to or between 90, 91, 92, 93, 94, 95, 96, 97, 98, 99, mol % CO and less than 200 ppmw of total sulfides, preferably less than 50 ppmw of total sulfides, with the balance being CO$_2$ and optional inert gas. Desulfurized stream 114 can exit purification unit 104 (FIG. 1A) and be collected, stored, or providing to another processing unit (e.g., a phosgene unit). Desirably, the desulfurized stream comprising less than or equal to 200 ppmv of total sulfides, preferably less than or equal to 100 ppmv, more preferably less than or equal to 50 ppmw, and still more preferably less than or equal to 25 ppmv of total sulfides, preferably for a period of greater than or equal to 50 hours, more preferably greater than or equal to 75 hours, and even more preferably greater than or equal to 95 hours, or greater than or equal to 100 hours.

C. System for Producing a Chemical Product from a CO-Rich Stream

Figure 2:
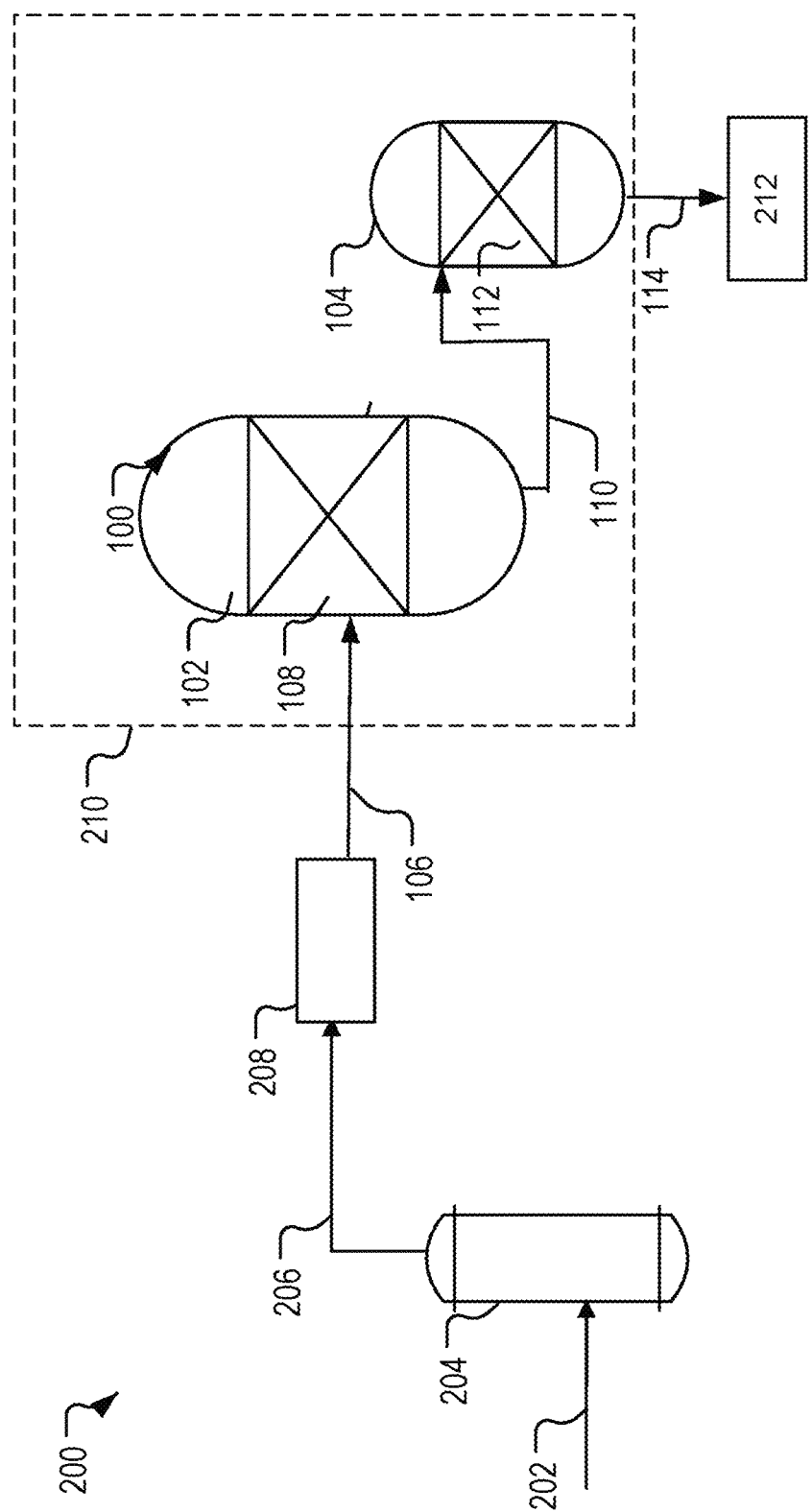
FIG. 2 is a schematic of a system that includes the desulfurization system of the present invention, a CO generating unit, and a CO reactor unit.

FIG. 2 illustrates a system that includes a CO generating unit and a CO reactor unit in combination with the desulfurizing system 100. In system 200, feed stream 202 containing petroleum coke, oxygen, and CO$_2$ can enter CO generating unit 204. In CO generating unit 204, the petroleum coke can be oxidized or partially oxidized to produce CO-rich stream 206. The reaction temperature can be from at least, equal to, or between any two of 200° C., 250° C., 300° C., 500° C., 600° C., 80° C., and 1000° C. A pressure can be at least, equal to, or between any two of 0.1, 0.15, 0.2, 0.25, 0.3, 0.35, 0.4, 0.45, 0.5, 0.55, 0.6, 0.65, 0.7, 0.75 to 0.8 MPa. For example, pressure can be 0.1 to 0.8 MPa, preferably 0.25 to 0.7 MPa, or 0.3 to 0.65 MPa. The CO-rich stream 206 can exit CO-generating unit at a temperature of 80° C. to 110° C. and a pressure of 0.1 to 0.2 MPa. CO-rich stream 206 can pass through cooling unit 208 (e.g., a compressor and/or a heat exchanger) to be cooled and/or pressurized to a temperature of less than 50° C. and produce cooled CO-rich stream 106. CO-rich stream 106 can exit the cooling unit 208 at a pressure of 0.5 to 0.85 MPa and a temperature of less than 50° C., and enter desulfurization unit 210. Desulfurization unit 210 can include desulfurization system 100 described in FIGS. 1A and 1B. In desulfurization unit 210, CO-rich stream 106 can be desulfurized to produce desulfurized CO-stream 114. Desulfurized CO-stream 114 can exit desulfurization unit 210 and enter CO-reactor unit 212. In CO-reactor unit 212, desulfurized CO-stream 114 can be converted into carbon containing compounds (e.g., phosgene, alcohols, etc.).

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

(Desulfurization of a CO-Rich Stream Generated from Petroleum Coke)

A CO-rich stream was generated from reactant stream containing petroleum coke, $CO_2$, $O_2$, and $N_2$ at the flow rate listed in Table 1. The stream numbers refer to the streams in FIG. 2. In first purification unit 104, activated carbon (13,000 lbs (590 kg), BPL™ activated carbon (Calgon Carbon Corporation, USA) was positioned. The CO-rich stream 106 was contacted with the activated carbon until a COS breakthrough was observed. The CO-rich stream 106 was dried to a dew point of less than −40° C. prior to contact with the activated carbon. The modified CO-rich stream 110 was contacted with zinc oxide based sorbent (15,680 lbs (7112 kg), SR-110CX, Unicat Catalyst Technologies, Inc.) in purification unit 108 to produce desulfurized stream 114. The unit was operated for more than 1200 hours at 18° C.

TABLE 1

| Stream # (FIG. 2), Mass flow, lb/hr | 202 | 206 | 106 | 110 | 114 |
|---|---|---|---|---|---|
| C | 4214 | 0 | 0 | 0 | 0 |
| CO | 0 | 12024 | 12024 | 12024 | 12024 |
| $CO_2$ | 4264 | 213 | 213 | 213 | 213 |
| $O_2$ | 5264 | 4 | 4 | 4 | 4 |
| $N_2$ | 42 | 42 | 42 | 42 | 42 |

TABLE 1-continued

| Stream # (FIG. 2), Mass flow, lb/hr | 202 | 206 | 106 | 110 | 114 |
|---|---|---|---|---|---|
| $H_2$ | 0 | 2.2 | 2 | 2 | 2 |
| COS | 0 | 121 | 121 | 0 | 0 |
| $CS_2$ | 0 | 61.5 | 61.5 | 0 | 0 |
| $H_2S$ | 0 | 2.5 | 2.5 | 2.5 | 0 |
| S | 120 | 0 | 0 | 0 | 0 |
| Temp.,° C. | 23 | 96 | 10 | 18 | 18 |
| Pressure, MPa | 0.12 | 0.12 | 0.83 | 0.8 | 0.8 |

Example 2

(Comparative Sorbents)

Different sorbents obtained from Unicat Catalyst Technologies (USA) with similar theoretical capacity were tested in lab scale units at 100° F. (37.8° C.) at 110 psig (0.85 MPa) with a feed containing 95 mol % CO, 4.9 mol % $CO_2$ and about 1000 ppmv $H_2S$. $H_2S$ and COS were monitored at the exit of the unit and the experiments were discontinued when either $H_2S$ or COS broke through at greater than 50 ppm. Table 2 lists the sorbent, weight used, flow rate, breakthrough time, and exit concentrations of $H_2S$ and COS at breakthrough. From the data, it was determined that a high activity alumina supported zinc oxide supplied by UNICAT (SR-110 CX) performed the best and demonstrated a tenfold higher capacity (bed life) to remove $H_2S$ selectively compared with other reactive sorbents. Surprisingly, it was also found that activated $Al_2O_3$ (WR-11) by itself has poor selectivity towards $H_2S$ removal. Even more surprisingly, it was found that a reactive sorbent containing ZnO and $MnO_2$ supported on alumina (SR-112 DMP) demonstrated poor selectivity towards $H_2S$ removal with COS breaking through a lot earlier than $H_2S$. Only one reactive sorbent that consisted of ZnO supported on alumina (SR-110 CX) demonstrated both the capacity and selectivity towards $H_2S$ to be fit for use economically. The preferred reactive sorbent ZnO on $Al_2O_3$ (e.g., SR-110 CX) has a high B.E.T. surface area of greater than 80 $m^2/g$ as measured in accordance with ASTM D3663-03. Not to be bound by theory, it is believe that this is one of the key factors behind the high sorption capacity at low temperatures (0° to 50° C.).

Furthermore, it must be noted that the reactive sorbent SR-110 CX is very selective to $H_2S$ removal compared with its selectivity to undesired reaction that leads to COS formation. One measure of selectivity to $H_2S$ removal is the ratio of breakthrough $H_2S$ to breakthrough COS. The preferred reactive sorbent material SR-110 CX has selectivity to $H_2S$ removal defined above about 17 in the example below.

TABLE 2

| # | Sorbent Composition | Weight (g) | Flow rate (sccm) | Bed life (h) | Breakthrough conc. (ppmv) $H_2S$ | COS |
|---|---|---|---|---|---|---|
| 1 | ZnO on $Al_2O_3$ (SR-110CX) | 8.2 | 59 | 100 | 174 | 10 |
| 2 | Activated $Al_2O_3$ (WR-11) | 8.1 | 59 | 2 | 13 | 250 |
| 3 | Promoted $Al_2O_3$ (Unisorb COS) | 7.8 | 59 | 2 | 1 | 129 |
| 4 | ZnO, $MnO_2$ on $Al_2O_3$ (SR-112 DMP) | 11.9 | 118 | 9 | 0 | 67 |
| 5 | Ca—Na zeolite (Unimol 5A modified) | 8.4 | 59 | 5 | 0 | 60 |

TABLE 2-continued

| # | Sorbent Composition | Weight (g) | Flow rate (sccm) | Bed life (h) | Breakthrough conc. (ppmv) $H_2S$ | Breakthrough conc. (ppmv) COS |
|---|---|---|---|---|---|---|
| 6 | Ca zeolite (Unimol 5A) | 8.5 | 70 | 3 | 0 | 104 |
| 7 | $Ag_2O$ on $Al_2O_3$ (Unicat MR-16Ag-A4) | 11.5 | 68 | 4 | 788 | 624 |

As can be from Table 2 above, Example 1 is active at low temperatures. In other words, the exit concentrations for the COS was below 100 ppmv for 100 hours. Actually, exit concentrations for the COS was below 50 ppmv for 100 hours of testing, while all of the other examples exhibited exit concentrations for the COS of greater than or equal to 60 ppmv after less than 10 hours of testing.

Example 3

This example used the operating conditions as described in Example 2 to present a complete profile of the concentrations of $H_2S$ and COS at the exit of the flow through the lab reactor described in Example 2 for ZnO on $Al_2O_3$ (SR-110CX). The results are set forth in Table 3.

TABLE 3

| Cumulative time (hr) | Cumulative $H_2S$ sorbed as wt % sorbent bed | Exit gas $H_2S$, ppmv | Exit gas COS, ppmv | Exit gas total sulfur compounds ($H_2S$ + COS), ppmv |
|---|---|---|---|---|
| 0 | 0 | 0 | 0 | 0 |
| 10 | 0.95 | 0 | 0 | 0 |
| 20 | 1.9 | 0 | 0 | 0 |
| 30 | 2.85 | 0 | 0 | 0 |
| 40 | 3.8 | 3 | 0 | 3 |
| 50 | 4.75 | 7 | 0 | 7 |
| 60 | 5.69 | 14 | 0 | 14 |
| 70 | 6.65 | 10 | 0 | 10 |
| 80 | 7.6 | 14 | 0 | 14 |
| 90 | 8.55 | 14 | 0 | 14 |
| 95 | 9.03 | 20 | 0 | 20 |
| 98 | 9.32 | 13 | 11 | 24 |
| 100 | 9.51 | 174 | 10 | 184 |

It can be clearly seen that the breakthrough of sorbent bed happens after 98 hours and when cumulative sorbed $H_2S$ exceeds 9 wt % of sorbent bed. Hence the ZnO on $Al_2O_3$ was highly active at temperatures of 0 to 50° C.

Therefore, it was unexpectedly discovered that then using the present process, e.g., contacting a CO-rich gas stream with a first sorbent material comprising activated carbon, and contacting the CO-rich gas stream with a second sorbent material comprising zinc oxide (e.g., on alumina), a desulfurized CO-rich gas stream suitable for reaction with a chlorine gas to produce phosgene is produced. The desulfurized CO-rich gas stream comprises less than or equal to 100 ppmv of total sulfides (e.g., combined $H_2S$ and COS), preferably less than or equal to 100 ppmv, more preferably less than or equal to 50 ppmw, and still more preferably less than or equal to 25 ppmv of total sulfides. As is shown in Table 3, the desulfurized CO-rich gas stream had less than 10 ppmv of $H_2S$ and COS, combined, for over 50 hours. The amount of total sulfides (e.g., combined $H_2S$ and COS) is maintained for a period of greater than or equal to 50 hours, more preferably greater than or equal to 75 hours, and even more preferably greater than or equal to 95 hours, or greater than or equal to 100 hours.

Preferably the process comprises first contacting a CO-rich gas stream with a first sorbent material comprising activated carbon, and subsequently contacting the CO-rich gas stream with a second sorbent material comprising zinc oxide (e.g., on alumina), to avoid $H_2S$ formation during the second contacting.

Also disclosed in the context of the present invention are aspects 1-20.

Aspect 1 is a method of removing sulfur-containing compounds from a carbon monoxide (CO)-rich gas stream having greater than 50 mol % carbon monoxide (CO) and preferably 10-1000 ppmw $H_2S$, the method comprising: (a) contacting the CO-rich gas stream with a first sorbent material comprising activated carbon to remove at least a portion of the sulfur-containing compounds present in the stream; and (b) contacting the CO-rich gas stream with a second sorbent material comprising zinc-oxide at a temperature of 50° C. or less to remove at least a portion of the sulfur-containing compounds present in the stream. Aspect 2 is the method of aspect 1, wherein the CO-rich gas stream has at least 50 mol %, preferably at least 90 mol %, CO and less than 5 mol %, preferably less than 1 mol % $H_2$. Aspect 3 is the method of any one of aspects 1 to 2, wherein contacting step (b) is performed at a temperature of 0° C. to 50° C., preferably 15° C. to 50° C., and wherein contacting step (a) is optionally performed at a temperature of 0° C. to 50° C., preferably 15° C. to 50° C. Aspect 4 is the method of any one of aspects 1 to 3, wherein the zinc oxide in the second sorbent material is supported zinc oxide. Aspect 5 is the method of aspect 4, wherein the support is alumina ($Al_2O_3$). Aspect 6 is the method of aspect 5, wherein the second sorbent material comprises 60 wt % to 70 wt % zinc oxide and 30 wt % to 40 wt % alumina. Aspect 7 is the method of any one of aspects 1 to 4, wherein the second sorbent material comprises 60 wt % to 70 wt % zinc oxide. Aspect 8 is the method of any one of aspects 1 to 7, wherein the second sorbent material is not doped with catalytically active metal, preferably, copper (Cu), iron (Fe), molybdenum (Mo), cerium (Ce), nickel (Ni), magnesium (Mg), chromium (Cr), and/or manganese (Mn), or alloys or oxides thereof. Aspect 9 is the method of any one of aspects 1 to 8, wherein step (a) is performed prior to step (b). Aspect 10 is the method of any one of aspects 1 to 9, wherein a metal oxide impregnated activated carbon sorbent material is not used in the method. Aspect 11 is the method of any one of aspects 1 to 10, wherein the sulfur-containing compounds comprise carbonyl sulfide (COS), carbon disulfide ($CS_2$), and hydrogen sulfide ($H_2S$), wherein the first sorbent material removes at least a portion of COS and $CS_2$ from the CO-rich stream, and wherein the second sorbent material removes at least a portion of $H_2S$ from the CO-rich stream. Aspect 12 is the method of aspect 11, wherein the desulfurized CO-rich gas stream has 200 ppm or less of total sulfides, wherein the total sulfides include $H_2S$, COS, and $CS_2$. Aspect 13 is the method of any one of aspects 1 to 12, wherein the de-sulfurized CO-rich gas stream is reacted with chlorine gas ($Cl_2$) to produce phosgene ($COCl_2$). Aspect 14 is the method of any one of aspects 1 to 13, wherein contact of the CO-rich gas stream with the zinc oxide sorbent material of step (b) does not produce COS and/or $CS_2$, and optionally wherein the contact step (b) is performed in the absence of water and/or the CO-rich gas stream has a dew point of less than −40° C. Aspect 15 is the method of any one of aspects 1 to 14, wherein the carbon monoxide (CO)-rich gas stream further comprises 0-20,000 ppmw COS and 0-10,000 ppmw $CS_2$ (e.g., greater than 0 to 10,000 ppmw, such as 2 to 10,000 ppmw). Aspect 16 is the method of any one of aspects 1 to 15, wherein step (b) produces a de-sulfided CO-rich gas stream comprising less than or equal to 200 ppmv of total sulfides, preferably less than or equal to 100 ppmv, more preferably less than or equal to 50 ppmw, and still more preferably less than or equal to 25 ppmv of total sulfides, preferably for a period of greater than or equal to 50 hours, more preferably greater than or equal to 75 hours, and even more preferably greater than or equal to 95 hours, or greater than or equal to 100 hours. Aspect 17 is the method of any one of aspects 1 to 16, wherein the second sorbent material has an $H_2S$ sorption capacity of greater than 6 wt %, preferably greater than or equal to 8 wt %, more preferably greater than or equal to 9 wt %, of the second sorbent material weight at 37.8° C. and 0.85 MPa, e.g., prior to breakthrough of greater than or equal to 100 ppm $H_2S$, preferably prior to breakthrough of greater than or equal to 100 ppm $H_2S$ and COS combined.

Aspect 17 is a method of removing $H_2S$ from a CO-rich gas stream that has at least 50 mol % carbon monoxide, the method comprising: contacting the CO-rich gas stream with an sorbent material comprising a supported zinc oxide, preferably an alumina ($Al_2O_3$) supported zinc oxide, and even more preferably, an $Al_2O_3$ supported zinc-oxide comprising 60 wt % to 70 wt % zinc oxide and 30 wt % to 40 wt % $Al_2O_3$ at a temperature of 50° C. or less to remove at least a portion of $H_2S$ present in the stream to produce a purified CO-rich gas stream, wherein the sorbent material is not doped with copper (Cu), iron (Fe), molybdenum (Mo), cerium (Ce), nickel (Ni), magnesium (Mg), chromium (Cr), and/or manganese (Mn), or alloys or oxides thereof, and wherein the selectivity of the sorbent material to $H_2S$ removal compared with its selectivity to COS formation defined as the ratio of ppm $H_2S$ to ppm COS at breakthrough of the sorbent bed is greater than 10.

Aspect 18 is the method of aspect 17, wherein the support is alumina ($Al_2O_3$). Aspect 19 is the method of aspect 18, wherein the sorbent material comprises 60 wt % to 70 wt % zinc oxide and 30 wt % to 40 wt % alumina. Aspect 20 is the method of any one of aspects 17 to 19, wherein the sorbent material does not include activated carbon. Aspect 21 is the method of any one of aspects 17 to 20, wherein the de-sulfided CO-rich gas stream has 200 ppmv or less, of total sulfides.

Aspect 20 is a desulfurization system for use in any one of aspects 1 to 19, the system comprising: a first purification unit comprising activated carbon and capable of removing at least a portion of COS or $CS_2$, or both, present in a CO-rich gas stream that has at least 50 mol % CO; a second purification unit in fluid communication with the first purification unit comprising zinc-oxide and capable of removing at least a portion of $H_2S$ present in the stream, the second purification unit operated at a temperature of 50° C. or less; optionally a CO generation unit capable of generating the CO-rich gas stream from petroleum coke and an oxygen source, the CO generation unit positioned upstream from the first and second purification units; and optionally a reactor positioned downstream from the first and second purification units and capable of converting CO to a chemical compound, preferably phosgene.

The following includes definitions of various terms and phrases used throughout this specification.

The term "BET specific surface area" refers to surface area determined using Brunauer-Emmett and Teller theory. BET surface area can be measured according to ASTM D3663-03 or ISO-9277.

The term "about" or "approximately" are defined as being close to as understood by one of ordinary skill in the art. In one non-limiting embodiment, the terms are defined to be within 10%, preferably within 5%, more preferably within 1%, and most preferably within 0.5%.

The term "substantially" and its variations are defined to include ranges within 10%, within 5%, within 1%, or within 0.5%.

The terms "wt %", "vol. %", or "mol %" refers to a weight, volume, or molar percentage of a component, respectively, based on the total weight, the total volume of material, or total moles, that includes the component. In a non-limiting example, 10 grams of component in 100 grams of the material is 10 wt % of component.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The term "sccm" means standard cubic centimeters per minute.

The terms "ppmv" mean parts per million by volume.

The terms "ppm" and "ppmw" mean parts per million by weight.

The term "active at low temperature" or "active at a temperature of less than 50° C.", or 'active at a temperature of 0° C.-50° C." refers to 10 g of a sorbent material that will produce a stream having less than 100 ppm $H_2S$ and COS for greater than or equal to 75 hours, at 40° C., 0.85 MPa, and a flow rate of 59 sccm, with a feed containing 95 mol % CO, 4.9 mol % $CO_2$, and 1,000 ppmv $H_2S$.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods and systems of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the methods and systems of the present invention are their abilities desulfurize a CO-rich stream in an economical manner at temperatures less than 50° C.

The invention claimed is:

1. A method of removing sulfur-containing compounds from a carbon monoxide (CO)-rich gas stream having at least 50 mol % CO, the method comprising:
    (a) contacting the CO-rich gas stream with a first sorbent material comprising activated carbon to remove at least a portion of the sulfur-containing compounds present in the stream; and
    (b) contacting the CO-rich gas stream with a second sorbent material comprising a non-carbon supported zinc oxide at a temperature of 0 to 50° C. to remove at least a portion of the sulfur-containing compounds present in the stream and produce a de-sulfided gas stream.

2. The method of claim 1, wherein the second sorbent material comprises the zinc oxide supported on alumina.

3. The method of claim 2, wherein the second sorbent material has a B.E.T. surface area of greater than 80 m$^2$/g, as measured in accordance with ASTM D3663-03.

4. The method of claim 1, wherein the selectivity of the second sorbent material to H$_2$S removal compared with its selectivity to COS formation defined as the ratio of ppm H$_2$S to ppm COS at breakthrough of the sorbent is greater than 10.

5. The method of claim 1, wherein the CO-rich gas stream has at least 50 mol % CO, and less than 5 mol % hydrogen (H$_2$).

6. The method of claim 1, wherein contacting step (a) is performed at a temperature of 0° C. to 50° C.

7. The method of claim 6, wherein the second sorbent material comprises the zinc oxide supported on alumina (Al$_2$O$_3$).

8. The method of claim 1, wherein contact of the CO-rich gas stream with the second sorbent material of step (b) does not produce COS and/or CS$_2$, and optionally wherein the CO-rich stream has a dew point of −40° C. or less.

9. The method of claim 1, wherein the second sorbent material comprises 10 wt % to 90 wt % zinc oxide.

10. The method of claim 1, wherein the second sorbent material is not doped with catalytically active metal.

11. The method of claim 1, wherein the sulfur-containing compounds comprise carbonyl sulfide (COS), carbon disulfide (CS$_2$), and hydrogen sulfide (H$_2$S), wherein the first sorbent material removes at least a portion of COS and CS$_2$ from the CO-rich stream, and wherein the second sorbent material removes at least a portion of H$_2$S from the CO-rich stream.

12. The method of claim 1, wherein the H$_2$S sorption capacity is greater than 9 wt % of H$_2$S sorbed before breakthrough.

13. The method of claim 1, further comprising: reacting chlorine gas with CO in the de-sulfurized CO-rich gas stream to produce phosgene.

14. The method of claim 1, wherein the de-sulfurized CO-rich gas stream has 25 ppmw or less total of H$_2$S and COS combined.

15. The method of claim 1, wherein contacting step (b) is performed at a temperature of 15° C. to 50° C., and wherein contacting step (a) is performed at a temperature of 15° C. to 50° C.

16. The method of claim 1, wherein:
    the carbon monoxide (CO)-rich gas stream has 10-1000 ppmw H$_2$S;
    contacting the CO-rich gas stream with the second sorbent material comprises contacting the CO-rich gas stream with the second sorbent material at a temperature of 15 to 50° C.;
    the second sorbent material comprises the zinc oxide supported on alumina;
    the second sorbent material has a B.E.T. surface area of greater than 100 m$^2$/g, and has an H$_2$S sorption capacity of greater than 9 wt % of the second sorbent material weight at 37.8° C. and 0.85 MPa, and
    the second sorbent material comprises 60 wt % to 70 wt % zinc oxide.

17. A method of removing sulfur-containing compounds from a carbon monoxide (CO)-rich gas stream having at least 50 mol % CO, the method comprising:
    (a) contacting the CO-rich gas stream with a first sorbent material comprising activated carbon to remove at least a portion of the sulfur-containing compounds present in the stream; and
    (b) contacting the CO-rich gas stream with a second sorbent material comprising zinc oxide at a temperature of 0 to 50° C. to remove at least a portion of the sulfur-containing compounds present in the stream and produce a de-sulfided gas stream,
    wherein step (a) is performed prior to step (b) or step (b) is performed prior to step (a).

18. The method of claim 17, wherein the de-sulfurized CO-rich gas stream has 100 ppmw or less total of H$_2$S and COS combined.

19. A method of removing sulfur-containing compounds from a carbon monoxide (CO)-rich gas stream having at least 50 mol % CO, the method comprising:
    (a) contacting the CO-rich gas stream with a first sorbent material comprising activated carbon to remove at least a portion of the sulfur-containing compounds present in the stream; and
    (b) contacting the CO-rich gas stream with a second sorbent material comprising zinc oxide at a temperature of 0 to 50° C. to remove at least a portion of the sulfur-containing compounds present in the stream and produce a de-sulfided gas stream, wherein a metal oxide impregnated activated carbon sorbent material is not used in the method.

* * * * *